(12) United States Patent
Musalay et al.

(10) Patent No.: US 11,934,857 B2
(45) Date of Patent: Mar. 19, 2024

(54) SUPPORTING EXECUTION OF A COMPUTER PROGRAM BY USING A MEMORY PAGE OF ANOTHER COMPUTER PROGRAM

(71) Applicant: VMWARE, INC., Palo Alto, CA (US)

(72) Inventors: Goresh Musalay, Pune (IN); Sachin Shinde, Pune (IN); Zubraj Singha, Bangalore (IN); Tanay Ganguly, Bangalore (IN); Kashish Bhatia, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 479 days.

(21) Appl. No.: 17/323,004

(22) Filed: May 18, 2021

(65) Prior Publication Data

US 2022/0300315 A1 Sep. 22, 2022

(30) Foreign Application Priority Data

Mar. 16, 2021 (IN) .............................. 202141011158

(51) Int. Cl.
*G06F 9/455* (2018.01)
(52) U.S. Cl.
CPC ............... *G06F 9/45558* (2013.01); *G06F 2009/45579* (2013.01)

(58) Field of Classification Search
CPC ................. G06F 9/45558; G06F 2009/45579
See application file for complete search history.

(56) References Cited

U.S. PATENT DOCUMENTS

| 9,135,038 B1 * | 9/2015 | Uchronski | ............ G06F 9/5077 |
| 2010/0274947 A1 * | 10/2010 | Ohta | ................... G06F 9/45558 718/1 |
| 2018/0173555 A1 * | 6/2018 | Lutas | ...................... G06F 21/53 |
| 2018/0329638 A1 * | 11/2018 | Tsirkin | .................. G06F 3/0619 |

* cited by examiner

*Primary Examiner* — Wissam Rashid
(74) *Attorney, Agent, or Firm* — King Intellectual Asset

(57) ABSTRACT

Example methods are provided to identify unused memory regions in pages that are allocated for storing executable code. One or more of the unused memory regions are usable as a secure location to store confidential information shared between a hypervisor on the host and a guest (such as a guest virtual computing instance) that runs on the host. The one or more unused memory regions may also be used to store executable code (such as valid executable code of antivirus software or other security program) that has been prevented/delayed in its execution by malicious code that has occupied the pages, thereby providing the executable code with sufficient memory resources to enable the executable code to at least partially complete execution.

21 Claims, 5 Drawing Sheets

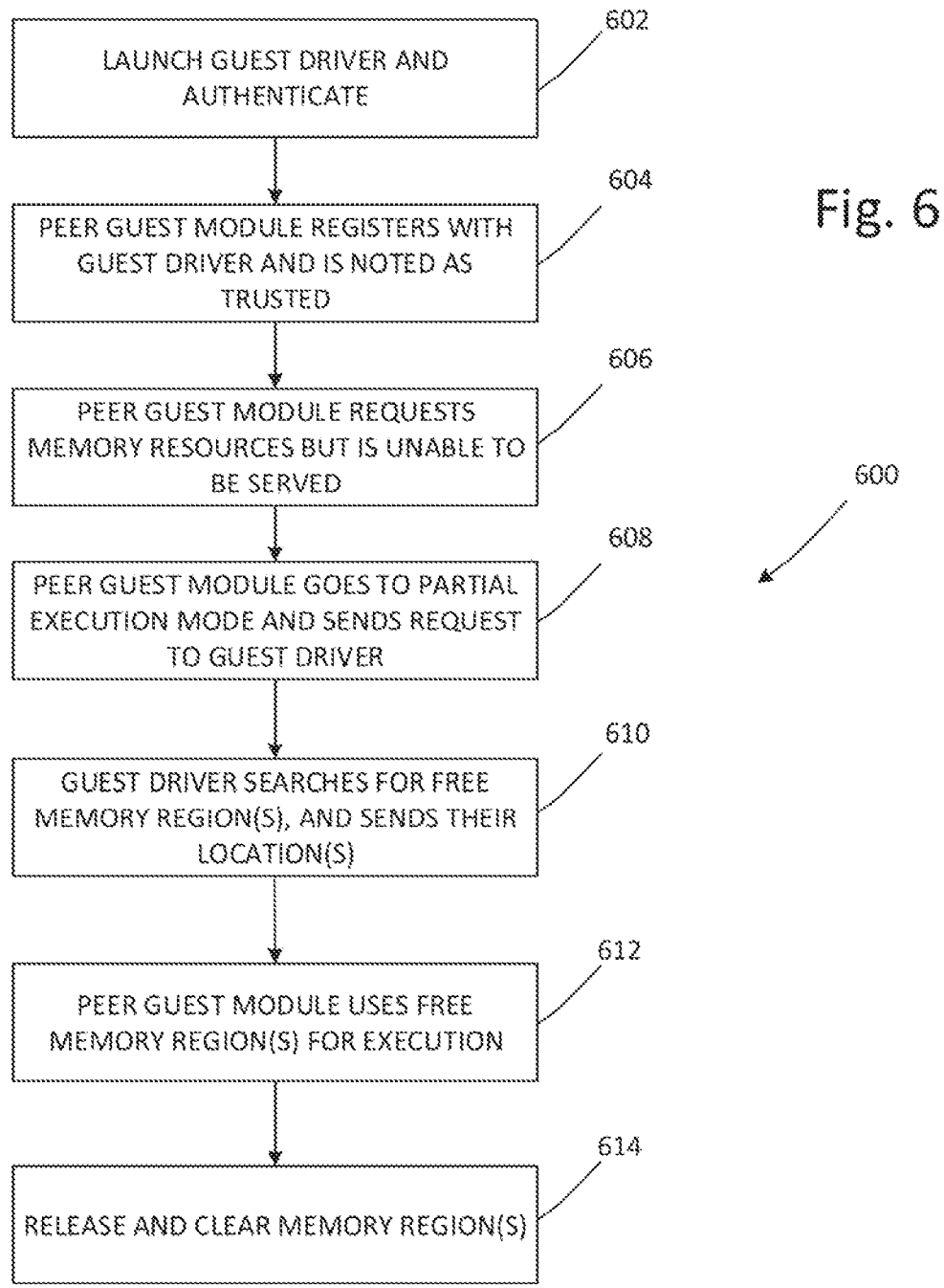

SUPPORTING EXECUTION OF A COMPUTER PROGRAM BY USING A MEMORY PAGE OF ANOTHER COMPUTER PROGRAM

RELATED APPLICATIONS

Benefit is claimed under 35 U.S.C. 119(a)-(d) to Foreign Application Serial No. 202141011158 filed in India entitled "SUPPORTING EXECUTION OF A COMPUTER PROGRAM BY USING A MEMORY PAGE OF ANOTHER COMPUTER PROGRAM", on Mar. 16, 2021, by VMware, Inc., which is herein incorporated in its entirety by reference for all purposes The present application Ser. No. 17/323,004 is related in subject matter to U.S. patent application Ser. No. 17/322,957, which is incorporated herein by reference

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources may include central processing unit (CPU) resources, memory resources, storage resources, network resources, etc.

However, a virtualized computing environment having hosts that support VMs is often vulnerable to malware, viruses, rootkits, spyware, or other types of malicious code. This vulnerability may exist even if a security mechanism (such as antivirus software) is installed in the host/VMs.

As a first example, a guest VM supported by a host may have applications running inside of the VM. An application may in turn have or use data that is stored inside of the VM on a disk or in memory. Confidential information like passwords, decryption keys, security policy information, etc. are examples of such data that may be stored inside of the VM on a disk/memory of the VM, and which are used by a security mechanism. Although the security mechanism is in place in the VM, malware or other malicious code can sometimes still manage to access (e.g., read or utilize) the encryption keys, security policy information, etc. that are stored in the disk/memory (or other storage device) of the VM, and thereby cause damage to or otherwise adversely affect the performance of the VM and/or its host.

As another example, malicious code can sometimes prevent, delay, or otherwise adversely interfere with the execution of the security mechanism (e.g., the execution of the security mechanism's modules/subcomponents), thereby also creating opportunities to cause damage to or adversely affect the performance of the VM and/or its host.

BRIEF DESCRIPTION OF DRAWINGS

FIG. 6 is a flowchart of an example method to use the free memory regions to support the execution of executable code in the virtualized computing environment of FIG. 1.

DETAILED DESCRIPTION

Figure 1:
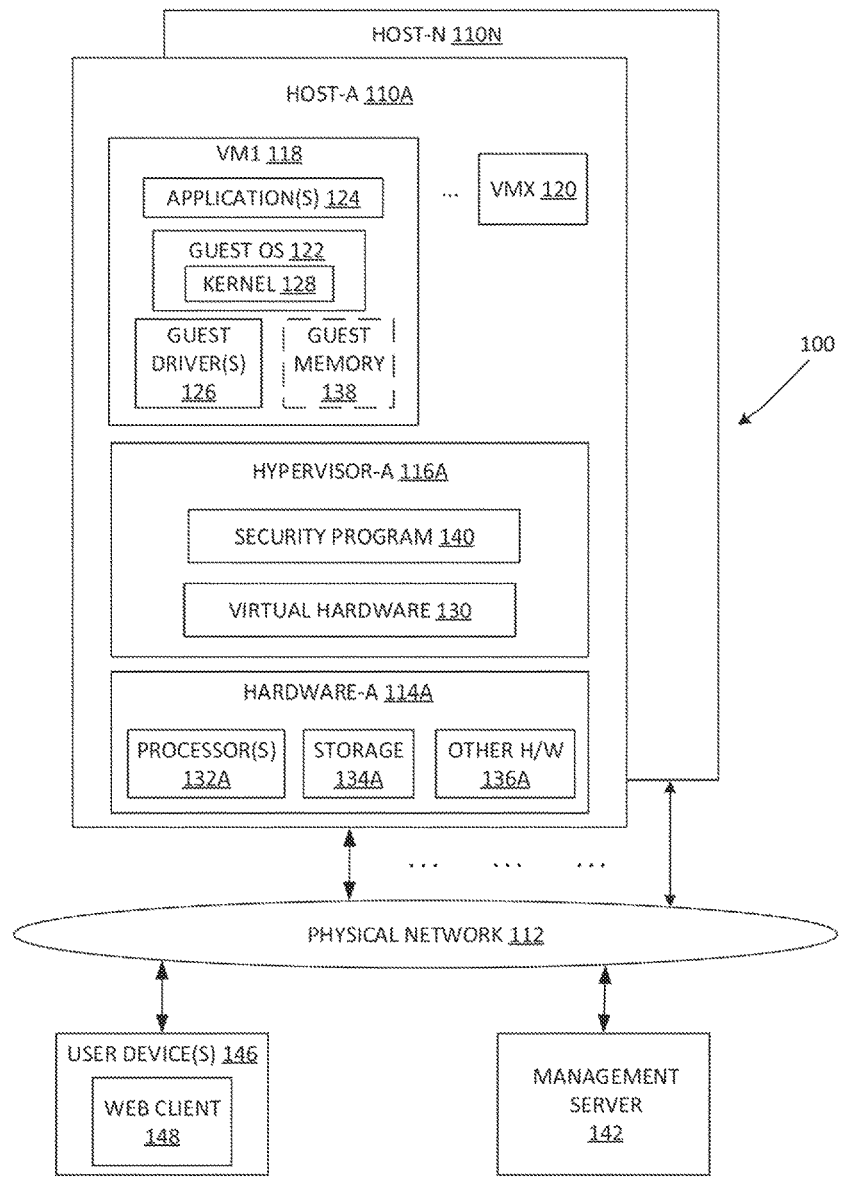
FIG. 1 is a schematic diagram illustrating an example virtualized computing environment that can implement a method to provide a secured memory region.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses the above-described drawbacks in defense systems for virtualized computing environments, as well as addressing other drawbacks. For example in a virtualized computing environment that implements a security mechanism such as passwords, encryption/decryption keys, security polices, antivirus software, and other security-related tools, confidential information is often stored by a guest virtualized computing instance, such as a guest virtual machine (VM) that is supported by a hypervisor on a host. The guest VM stores the confidential information in a storage location that is accessible by applications that run in the VM. Malicious code can infect these applications or may otherwise get installed in the guest VM so as to gain access to confidential information in the storage location. Thus, despite the presence of the security mechanism(s), the malicious code can still access the confidential information and cause harm. As another example, malicious code may usurp a significant amount of memory capacity (e.g., most or all of available memory), thereby causing a security mechanism (such as antivirus software) to be prevented or delayed in its execution, as a result of being starved out of memory resources required for execution.

Accordingly, techniques are provided herein to identify unused memory regions in pages that are allocated for storing executable code. One or more of the unused memory regions are usable as a secure location to store confidential information shared between a hypervisor on the host and a guest (such as a guest virtualized computing instance) that runs on the host. The unused memory region(s) are not visible to the applications (including possible malicious code) that run in the guest VM, and so provide a secure location for storing confidential information.

Moreover, the one or more unused memory regions may also be used to store executable code (such as valid executable code of antivirus software or other security program) that has been prevented/delayed in its execution by malicious code occupying the memory pages. By making the unused memory region(s) available for use by the valid executable code, the executable code is supplied with sufficient memory resources to enable the executable code to at least partially complete execution. With such execution allowed to proceed/complete, the executable code (e.g., executable code of antivirus software) can then perform its task(s) to identify the presence of the malicious code and initiate remedial actions. Reference throughout this disclosure to malicious code is understood to include potentially malicious code or actual malicious code (e.g., code that is verified to be malicious).

Computing Environment

To further explain the operations of the elements that may cooperate to identify and utilize unused memory regions for storage of confidential information, for supporting the execution of executable code, etc., various implementations will now be explained in more detail using FIG. 1, which is a schematic diagram illustrating an example virtualized computing environment 100 that can implement a method to provide a secure memory region. Depending on the desired implementation, virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of the host-A 110A. Each of the other host-N 110N can include substantially similar elements and features.

The host-A 110A includes suitable hardware 114A and virtualization software (e.g., a hypervisor-A 116A) to support various virtual machines (VMs). For example, the host-A 110A supports VM1 118 . . . VMX 120. In practice, the virtualized computing environment 100 may include any number of hosts (also known as computing devices, host computers, host devices, physical servers, server systems, physical machines, etc.), wherein each host may be supporting tens or hundreds of virtual machines. For the sake of simplicity, the details of only the single VM1 118 are shown and described herein.

VM1 118 may be a guest VM that includes a guest operating system (OS) 122 and one or more guest applications 124 (and their corresponding processes) that run on top of the guest OS 122. The guest OS 122 includes a kernel 128. VM1 118 also includes a guest driver 126. The guest driver 126 of various embodiments may be in the form of a kernel-mode driver that may run as part of the guest OS 122. An example of the guest driver 126 is a guest integrity driver that performs security-related operations such as checking/validating the integrity of the guest OS 122 and other elements of VM1 118, monitoring for presence of or attacks from malicious code, etc. Further details of the features and use of the guest driver 126 will be described later below with respect to FIGS. 2-6, including operations related to identifying and allocating unused memory regions as a secure region for storing confidential information, for supporting the execution of executable code, etc.

For the sake of explanation, the guest driver 126 is described herein in the context of being a kernel-mode driver and/or is referred to generally as a driver. It is to be appreciated that other embodiments may provide an engine, module, agent, application, or other type of code or computer-executable instructions (all of which may also be generally referred to herein as a driver, for the sake of explanation) that can perform the same or similar operations as the guest driver 126. Such driver(s) in VM1 118 may be part of the guest OS 122 or may be separate from or external to the guest OS 122.

One or more of the guest OS 122, the guest application(s) 124, the guest driver 126, and other code and related data (including data structures) associated with operating VM1 118 may be stored in a guest memory space that is provisioned for VM1 118 and/or in some other storage location in host-A 110A. The guest memory space allocated/provisioned for VM1 118 is graphically represented by a guest memory 138 shown in broken lines in FIG. 1.

The hypervisor-A 116A may be a software layer or component that supports the execution of multiple virtualized computing instances. The hypervisor-A 116A may run on top of a host operating system (not shown) of the host-A 110A or may run directly on hardware 114A. The hypervisor 116A maintains a mapping between underlying hardware 114A and virtual resources (depicted as virtual hardware 130) allocated to VM1 118 and the other VMs.

In one embodiment, a security program 140 may run on top of or within the hypervisor-A 116A. In the example embodiment of FIG. 1, the security program 140 is depicted as running within or as part of the hypervisor 116A. In other embodiments, the security program 140 may run within or may be installed at other locations within the host-A 110A.

Also, the security program 140 may include distributed sub-elements. For instance, one sub-element of the security program 140 may be embodied by the guest driver 126 and/or other security element in VM1 118 (such as a peer guest module installed in VM1 118 and that performs security-related operations in addition to those performed by the guest driver 126). Another sub-element of the security program 140 may reside in the hypervisor-A 116A and/or elsewhere in the host-A 110A. Yet another sub-element of the security program 140 may reside in some other stand-alone device(s), such as at a management server 142 and/or other device. For the sake of simplicity of illustration, at least some of these distributed sub-elements of the security program 140 are collectively shown in FIG. 1 as the security program 140 residing in the hypervisor-A 116A.

The security program 140 may be configured in one embodiment to receive alerts from the guest driver 126 about possible malicious code, and to take a remedial action in response to an alert from the guest driver 126. For example, the security program 140 may take remedial actions such as shutting down VM1 118, disabling the guest OS 122, deleting malicious code, sending a report to the management server 142 so as to enable a system administrator to further evaluate the alert(s) from the guest driver 126, etc.

Hardware 114A includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and application(s) in the virtual machine, such as the guest OS 122 and the application(s) 124 (e.g., a word processing application, accounting software, a browser, etc.) in VM1 118. Corresponding to the hardware 114A, the virtual hardware 130 may include a virtual CPU, a virtual memory (including the guest memory 138), a virtual disk, a virtual network interface controller (VNIC), etc.

The management server 142 of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster. The functionality of the management server 142 may be accessed via one or more user devices 146 that are operated by a system administrator. For example, the user device 146 may include a web client 148 (such as a browser-based application) that provides a user interface operable by the system administrator to view and evaluate alerts provided by the security program 140 to the management server 142. The system administrator may then operate the user interface of the web client 148 to facilitate the implementation of a remedial action, such as shutting down a VM, disabling a guest OS, debugging, troubleshooting, etc.

The management server 142 may be communicatively coupled to host-A 110A . . . host-N 110N (and hence communicatively coupled to the virtual machines, hypervisors, agents, drivers, applications and modules, hardware, etc.) via the physical network 112. The host-A 110A . . . host-N 110N may in turn be configured as a data center that is managed by the management server 142. In some embodiments, the functionality of the management server 142 may be implemented in any of host-A 110A . . . host-N 110N, instead of being provided as a separate standalone device such as depicted in FIG. 1.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Identifying and Accumulating Unused Memory Region(s)

The embodiments described herein build a memory list (e.g., identify memory regions of the guest memory 138) that is not visible to the applications 124 (and/or other code in VM1 118), thereby making it difficult or impossible for malicious code in VM1 118 (including malicious code that may have infected the applications 124) to read these memory regions in the guest memory 138. Such memory regions are thus secure and may be used to store confidential information (e.g., encryption keys, security policy information, passwords, etc.) and/or used for other purposes described herein.

These memory regions can comprise the unused memory regions within the memory space allocated to the executable code of the applications 124. As will be explained further below, the guest driver 126 can be configured to discover/identify the unused memory regions and to inform the hypervisor-A 116A of the unused memory regions, such as via a backdoor call or other communication technique. The hypervisor-A 116A can then utilize the unused memory regions for storing confidential information that can be shared with the guest driver 126 and/or other authorized elements/consumers of VM1 118. As such in this implementation and other implementations, the unused memory regions are usable as a type of secure scratchpad for temporary storage of confidential information, executable code of an antivirus software (e.g., code of a peer guest module of the security program 140) residing in VM1 118, etc.

Figure 2:
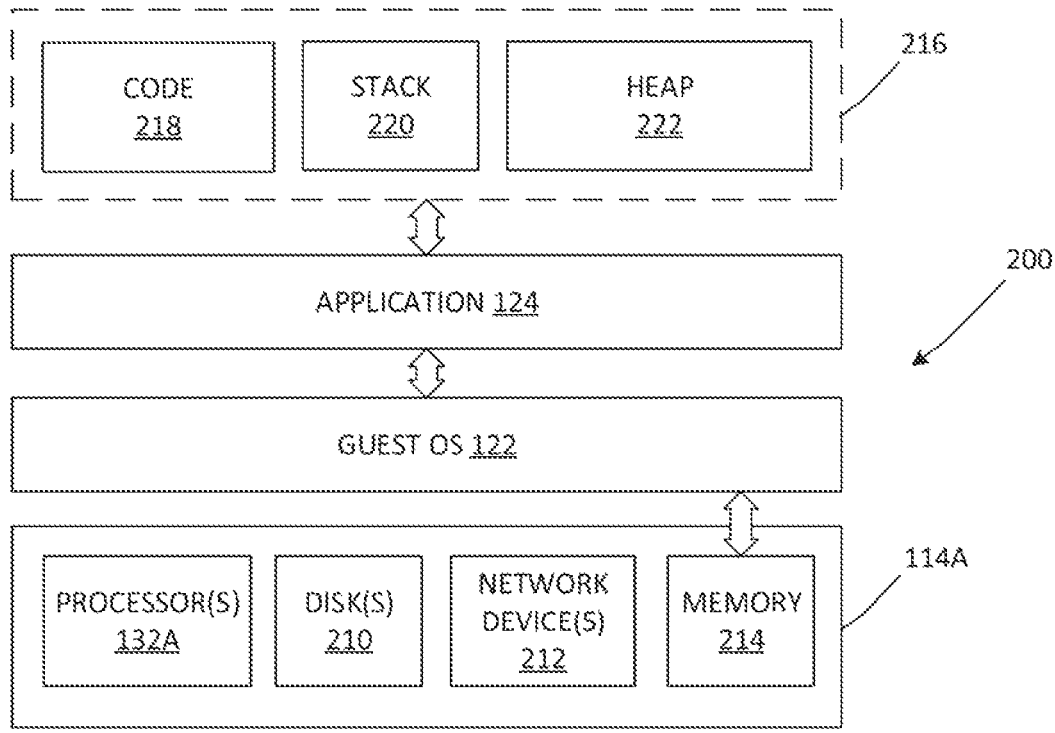
FIG. 2 is a diagram illustrating some of the elements in the virtualized computing environment of FIG. 1 that are involved in a process to allocate memory space.

These implementations to utilize the unused memory regions for various purposes will be described next in the context of the process used by operating systems (such as Microsoft Windows™) to allocate memory space for the applications 124 or other modules in VM1 118. More specifically and with reference to FIG. 2, FIG. 2 is a diagram 200 illustrating some of the elements in the virtualized computing environment 100 of FIG. 1 that are involved in a process to allocate memory space.

Beginning first at the hardware level, hardware 114A includes the processor(s) 132A, and the storage disk(s) 210 and network device(s) 212 (which are both previously depicted in FIG. 1 as the other hardware 136A). Hardware 114A also includes memory 214 (which is previously depicted in FIG. 1 by storage device(s) 134A). When the guest OS 122 launches at startup, the guest OS 122 determines the memory capacity in the memory 214 that is available for the application 124, and assigns/reserves a memory space (from the memory 214) for the application 124. This interaction is depicted in FIG. 2 by an arrow between the guest OS 122 and the memory 214.

Next, when the installed application 124 launches or loads, the application 124 requests memory resources from the guest OS 122 in order for the application 124 to begin execution. This interaction is depicted in FIG. 2 by an arrow between the application 124 and the guest OS 122.

In response to the request from the application 124 for memory resources, the guest OS 122 allocates a memory space 216 of the guest memory 138 to the application 124. This allocation is represented in FIG. 2 by an arrow between the application 124 and the memory space 216. Within the memory space 216, the guest OS 124 allocates portions for a memory space 218 for the executable code of the application 124, a memory space 220 for the stack (e.g., pointers, registers, etc.) used by the application 124, and a memory space 222 for the heap (e.g., data and non-executable code) of the application 124.

Figure 3:
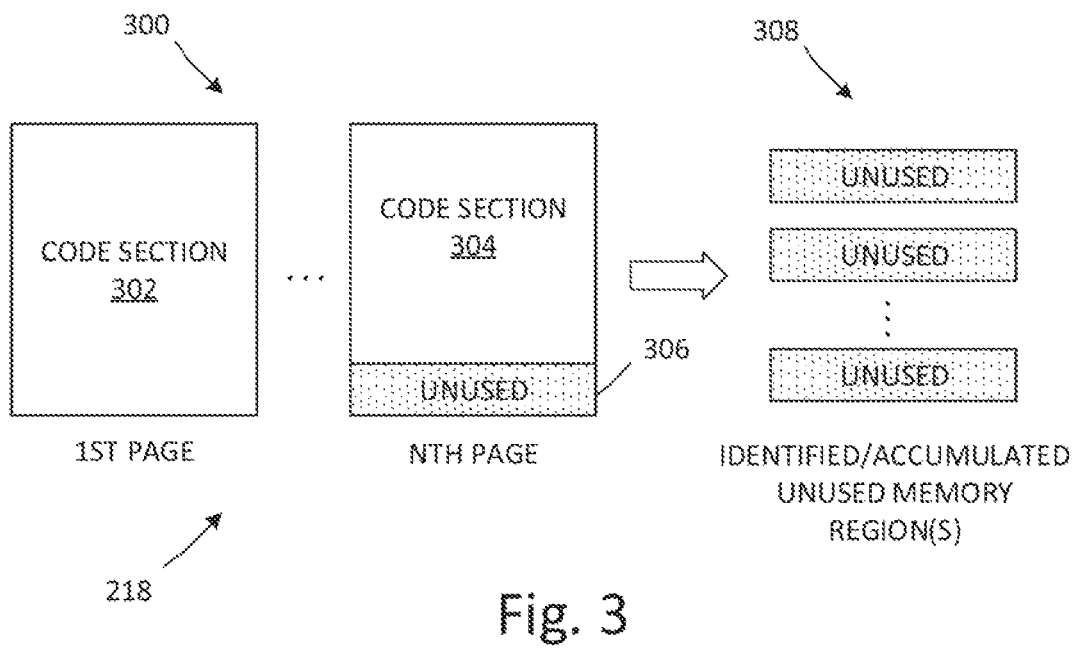
FIG. 3 is a diagram illustrating allocation of code sections to memory pages, with some unused memory regions being present.

Various operating systems use a page size mapping technique to allocate and store the executable code in the memory space 218. FIG. 3 is a diagram illustrating allocation of executable code sections to memory pages 300, with some unused memory regions being present. More specifically, the executable code may be divided up into one or more (multiple) code sections, which in turn are respectively stored in a memory page.

For instance, a first executable code section 302 is stored (e.g., allocated or assigned) to a first memory page, a second executable code section is stored in a second memory page, etc. up to a final executable code section 304 that is stored in an Nth memory page (wherein N is an integer greater than or equal to 1). The various N memory pages may each be made up of contiguous or non-contiguous memory regions. The memory pages 1 . . . N are each also typically uniform in their total size.

Usually, there is not a one-to-one correspondence between the size of the executable code and the size of the memory page(s). That is, the total size of the code is often less than the total available memory in the memory pages, and thus, there will be some amount of the memory pages that are unused (e.g., unoccupied) by the executable code.

FIG. 3 depicts an example wherein the executable code is divided such that the first memory page is fully occupied by the executable code section 302, and the last Nth memory page has an unused memory region 306 (at the end/second memory region of the Nth memory page) since the last remaining executable code section 304 (in an upper/first memory region of the Nth memory page) has a size that does not fully occupy the Nth memory page. Thus, unused memory region 306 is available for the purposes described herein for storing confidential information, supporting execution of other code, etc.

In other examples, the executable code may be divided by the guest OS 122 in some other manner, such that each of the executable code sections have the same size. With this method of dividing the executable code, each memory page 1 . . . N will have some unused memory region 306 available.

The portable executable (PE) of the application 124 has a data structure that provides the size of the executable code. Thus, the guest OS 122 can obtain this size information from the PE of the application 124, and determine how to divide the executable code for storage in the memory pages 1 . . . N. Furthermore, the guest OS 122 may also have its own PE data structure (and/or other mechanism) for storing information such as the size of each memory page, and the amounts and/or locations (addresses) in the memory page that are actually occupied by the executable code sections.

According to various embodiments, the guest driver 126 performs a pinning operation wherein the guest driver 126 marks the memory pages as read-only in the guest OS 122. With this pinning, the guest OS 122 and application 124 are aware of the memory regions occupied by the executable code (e.g., from the information contained in the header or other fields of the PE), but the presence and location of the unused memory region(s) 306 are kept hidden from either or both the guest OS 122 and the application 124. For example in one embodiment, the guest OS 122 and/or the application 124 do not know about the presence and location of the unused memory region(s) 306, and also may not have access rights to the unused memory region(s) 306 even if the presence/location of the unused memory region(s) 306 is somehow discovered.

The individual unused memory region(s) 306 are identified and accumulated by the guest driver 126, so as to create a secure combined memory region (shown at 308 in FIG. 3). The combined memory region 308 may be made up of either or both contiguous or non-contiguous individual memory regions. Moreover, the individual memory regions (e.g., scattered memory regions) may be contributed from memory pages used by executable code of a single application or multiple applications, and combined together to form the combined memory region 308 that operates as the shared memory.

Figure 4:
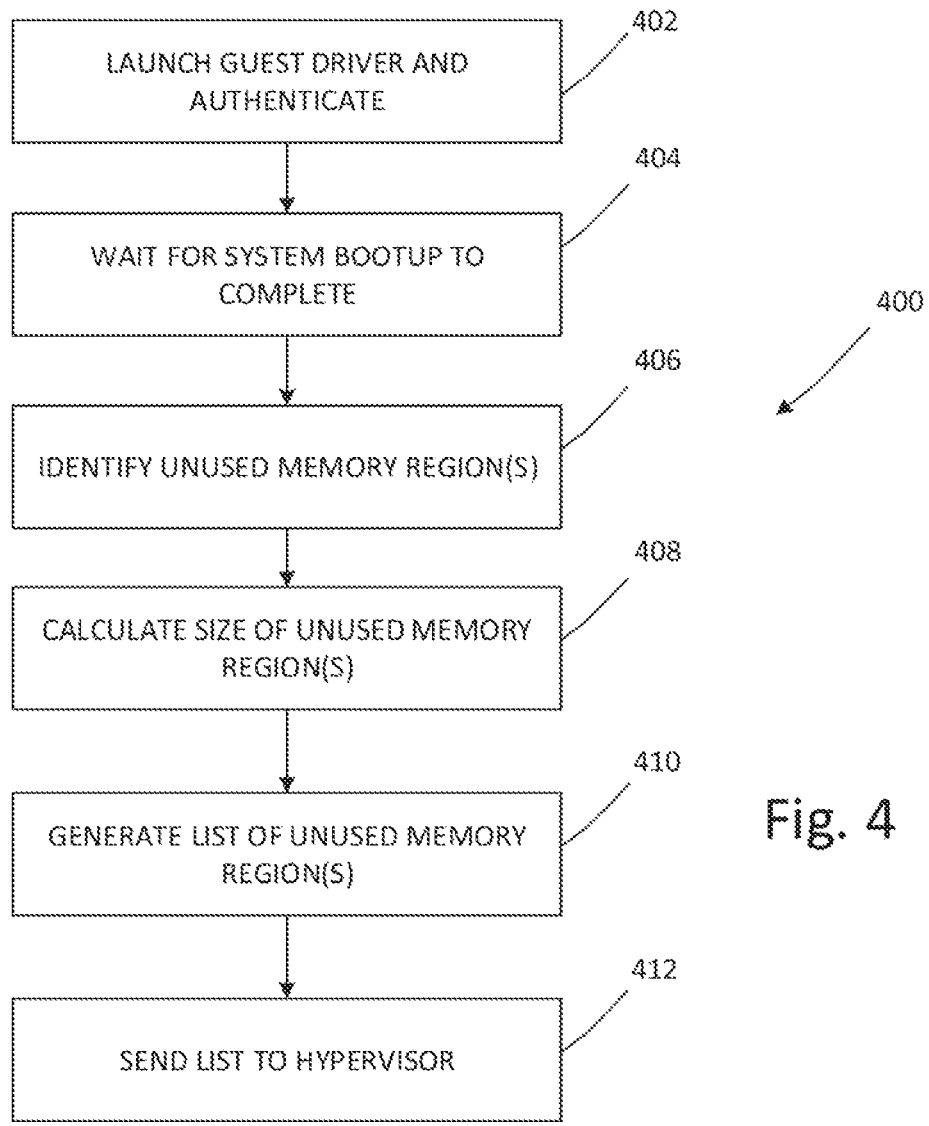
FIG. 4 is a flowchart of an example method to identify and accumulate unused memory regions in the virtualized computing environment of FIG. 1.

FIG. 4 is a flowchart of an example method 400 to identify and accumulate unused memory regions in the virtualized computing environment 100 of FIG. 1. Example method 400 may include one or more operations, functions, or actions illustrated by one or more blocks, such as blocks 402 to 410. The various blocks of the method 400 and/or of any other process(es) described herein may be combined into fewer blocks, divided into additional blocks, supplemented with further blocks, and/or eliminated based upon the desired implementation. In one embodiment, the operations of the method 400 and/or of any other process(es) described herein may be performed in a pipelined sequential manner. In other embodiments, some operations may be performed out-of-order, in parallel, etc.

According to one embodiment, at least some of the operations depicted in the method 400 may be performed by the guest driver 126 in cooperation with the guest OS 122 and the hypervisor-A 116A. Elements in a VM alternatively or in addition to the guest driver 126 may perform some of the operations in the method 400 in other embodiments.

Beginning at a block 402 ("LAUNCH GUEST DRIVER AND AUTHENTICATE"), a system bootup sequence is started in the host-A 11A, which includes starting up (e.g., instantiating) VM1 118 and its elements. During this system bootup sequence, the guest driver 126 is launched along with launching the guest OS 122. The guest driver 126 may also use an integrity process to register and authenticate itself with the security program 140 at the host-A 110 (e.g., at the hypervisor-A 116A) at the block 402.

The block 402 may be followed by a block 404 ("WAIT FOR SYSTEM BOOT TO COMPLETE"), wherein the guest driver 126 waits for the system bootup sequence to complete. During this system bootup sequence at the block 402, the guest OS 124 determines the available memory capacity in the memory 214 and assigns memory space to each of the applications 124, such as previously explained above with respect to FIG. 2.

The block 404 may be followed by a block 406 ("IDENTIFY UNUSED MEMORY REGION(S)"), wherein system bootup sequence has completed, and the guest driver 126 begins to identify unused memory regions, such as free memory blocks in memory pages. For instance and as explained above with respect to FIGS. 2 and 3, the application 124 is launching/loading/running and has requested memory resources from the guest OS 122. The guest OS 122 then divides the executable code of the application 124 into executable code sections, and allocates/stores the executable code sections in respective memory pages 300. The guest OS 122 stores (in a PE data structure) information that identifies the amount and/or locations of the memory regions in each memory page that is actually occupied by the executable code sections or data.

The guest driver 126 identifies all of the applications 124 (including modules) that have launched, and also identifies (by examining the information contained in the PE data structure of the guest OS 122, or obtained from some other information source) the specific memory pages that have been allocated to the executable code of each application 124. The guest driver 126 determines the start address (in the memory page) for each code section and the length/size of the code section in each memory page, which are also pieces of information that the guest driver 126 can obtain from the PE data structure or other information source. From this information, the guest driver 126 can determine the amount on a given memory page that is actually occupied by the executable code section.

The block 406 may be followed by a block 408 ("CALCULATE SIZE OF UNUSED MEMORY REGION(S)") wherein the guest driver 126 calculates the size of the unused memory regions in each individual memory page (e.g., the free memory blocks in each memory page that do not include or are free of executable code or data) and also may calculate the total (aggregated) size of the unused memory regions that may be combined together. For instance and as previously explained above with respect to FIG. 3, the guest OS 122 divides the executable code into code sections, and allocates a page for each code section—however, there is not a one-to-one correspondence between the size of each code section and the size of the respective memory page—therefore, there will be some unused memory region available in at least one of the memory pages. Thus, if N is the number of memory pages allocated to the executable code of a particular application 124, then the total size of the unused (free) memory space is equal to (N*size of memory page)–total size of executable code.

The block 408 may be followed by a block 410 ("GENERATE LIST OF UNUSED MEMORY REGION(S)") wherein the guest driver 126 generates a list of memory regions to report to the hypervisor-A 116A. The list can be in any suitable format and may vary from one implementation to another as to the information contained in the list.

For example, the list generated by the guest driver 126 can identify each specific memory page and the amount of free memory regions in that memory page. For a given memory page, this information may be represented in the list via the format of Page Number+Offset, Size in Bytes, wherein Offset indicates the start location of the unused memory region and Size in Bytes indicates the size of the unused memory region.

Alternatively or in addition to identifying the location and size of individual unused memory regions in each memory page as provided in the preceding example, the list generated by the guest driver 126 may also provide the accumulated/combined information, such as the total size obtained by combining all of the memory regions and the address location(s) of the memory region(s).

The block 410 may be followed by a block 412 ("SEND LIST TO HYPERVISOR") in which the guest driver 126 sends the list or otherwise reports the unused memory region(s) to the hypervisor-A 116A. The guest driver 126 may use a backdoor call other communication technique to inform the hypervisor-A of the unused memory region(s) at the block 412. The guest driver 126 may perform the operations described above repeatedly as applications are launched and closed (e.g., which corresponds in allocation and de-allocation of pages for executable code), thereby triggering updates to the location/identity and size of the unused memory regions. These updates could then trigger the guest driver 126 to generate an updated list to send to the hypervisor-A 116A.

Utilizing the Unused Memory Region(s) for Storing Confidential Information

Figure 5:
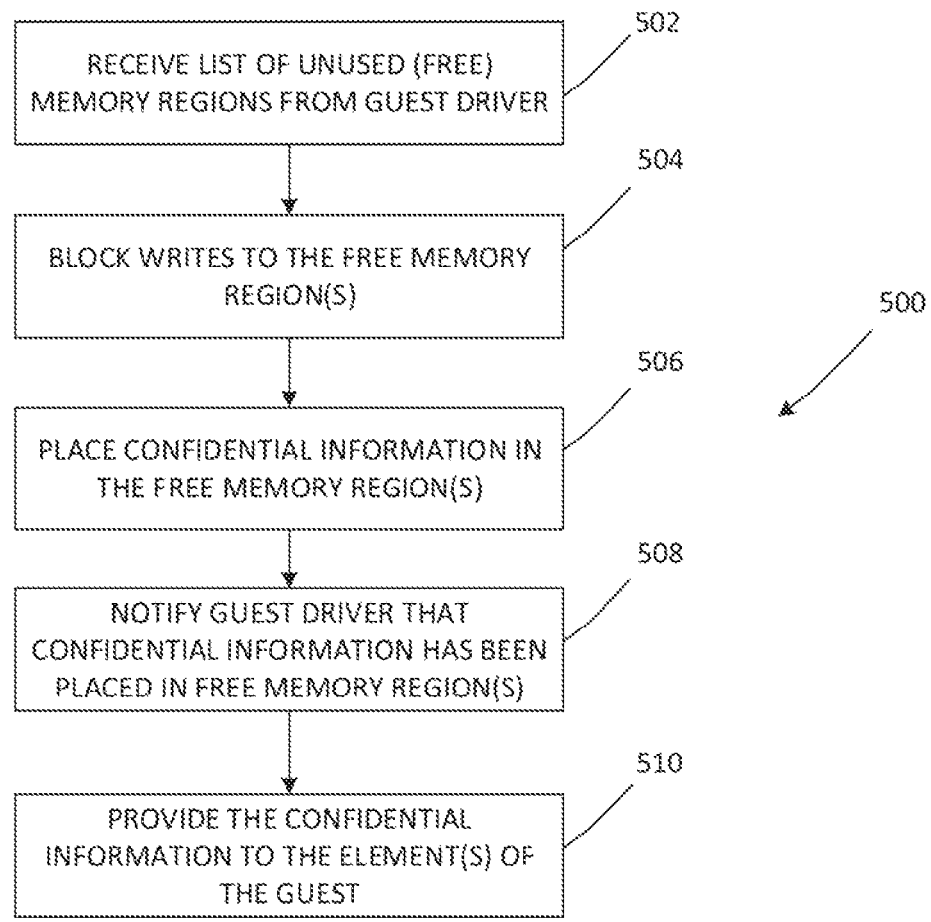
FIG. 5 is a flowchart of an example method to use the free memory regions to store confidential information in the virtualized computing environment of FIG. 1.

FIG. 5 is a flowchart of an example method 500 to use the unused (free) memory regions to store confidential information in the virtualized computing environment 100 of FIG. 1. The operations depicted in the method 500 may be performed by the guest driver 126 and the hypervisor-A 116A to use the memory region(s) as a shared scratchpad to communicate confidential information that would not be visible or accessible to the applications 124 (including possible malicious code).

At a block 502 ("RECEIVE LIST OF UNUSED (FREE) MEMORY REGIONS FROM GUEST DRIVER"), which continues from the block 412 in FIG. 4, the hypervisor-A 116A receives the list of unused memory regions (e.g., free memory regions or free memory blocks) from the guest driver 126. The hypervisor-A 116A may then catalog or otherwise keep a record of the free memory regions, their location and size, and the history of write operations to the memory region (e.g., whether the hypervisor-A 116A or the guest driver 126 may have currently placed information in the memory regions).

The block 502 may be followed by a block 504 ("BLOCK WRITES TO THE FREE MEMORY REGION(S)"), wherein the hypervisor-A 116A blocks write operations to the free memory region(s). More specifically, only the hypervisor-A 116A and the guest driver 126 are given write privileges to the free memory regions, and all other elements of VM1 118 do not have write privileges such that the memory regions are write-protected against these other elements of VM1 118. In some implementations, an extended page table (EPT) technique can be used by the hypervisor-A 116A to control/block writes to the free memory region(s).

Thus, the existence of the free memory region(s) may be hidden from the elements (including malicious code) of the guest VM1 118, and since the existence is not known to the malicious code, then the confidential information stored in the free memory regions is made secure from read/write operations attempted by the malicious code. For example, a heap spray attack would attack the heap stored in the memory space 222 shown in FIG. 2. However, such heap spray attack would be targeting the heap (data) contained in that portion (memory space 222) of the guest memory 138, and would not be aware of and so would not be targeting the confidential information stored in the free memory regions (which are located outside of the memory space 222) of the memory pages.

Furthermore, even if an element of the guest VM1 118 (e.g., an application or malicious code) happens to discover the existence of the free memory regions, such element would not have access rights to read/write the information stored in the free memory space.

The block 504 may be followed by a block 506 ("PLACE CONFIDENTIAL INFORMATION IN THE FREE MEMORY REGION(S)"), wherein the hypervisor-A 116A stores confidential information in the free memory region(s). The confidential information can include passwords, security policy information, decryption/encryption keys, etc. that is to be communicated between the hypervisor-A 116A and the guest VM1 118.

The length of time that the confidential information is stored in the free memory regions can vary from one implementation to another. For example, there may be a time limit in which the confidential information remains stored. As another example, an event can cause the information to be purged, such as being overwritten by new information, de-allocation of the memory page, deletion after a successful authorized read/copy of the stored information, etc.

The block 506 may be followed by a block 508 ("NOTIFY GUEST DRIVER THAT CONFIDENTIAL INFORMATION HAS BEEN PLACED IN FREE MEMORY REGION(S)"), wherein the guest driver 126 is notified that the hypervisor-A 116A has placed confidential information in the free memory region(s). The guest driver 126 may be notified in various ways. For example, the guest driver 126 may independently detect that the memory regions have been written to. As another example, the hypervisor-A 116A may send a separate communication to the guest driver 126 to inform the guest driver 126 that there is information in the memory regions.

The block 508 may be followed by a block 510 ("PROVIDE THE CONFIDENTIAL INFORMATION TO THE ELEMENT(S) OF THE GUEST") wherein the confidential information in the memory regions is provided to the element (e.g., a consumer process) of the guest VM1 118 that requires the confidential information. For example, if a particular application 124 needs a password in order to open a data file, then the password is provided from the memory region to the application 124.

Several techniques may be used to provide the confidential information to the consumer process. In one embodiment, the guest driver 126 is allowed to read the information in the memory region, since the guest driver 126 was authenticated with the security program, back at the block 402 in FIG. 4. Then, the guest driver 126 can pass the confidential information directly to the consumer process. In this manner, the consumer process is not informed of the location of the memory region where the confidential information is stored, and so the memory region can remain hidden.

In another embodiment, the guest driver 126 can copy the confidential information to an intermediate memory location, and inform the consumer process to read/access the confidential information from that intermediate memory location. In such an implementation, the location of the original memory region (scratchpad) also remains hidden and only the address of the intermediate memory location is revealed.

In still another embodiment, the guest driver 126 can inform the consumer process of the location (memory address of the scratchpad) where the consumer process might be able to directly read (but not write) the confidential information. In such implementation wherein the existence and location of the secure memory region is being revealed to the consumer process, the memory region may be a one-time-use scratchpad, such that the confidential information stored therein is deleted after being read and the scratchpad is not further used for storage of any other confidential information.

Thus in view of the foregoing, non-heap memory regions may be used as secure storage locations. Such secure storage locations may also have sufficient size/capacity to store security policy content, which may otherwise have storage limitations in other memory locations due to namespace size. Still further, granular inline remedial action can be taken by the security program 140, such that the specific remedial action to take can be determined based on the type and occurrence of a rule violation associated with the confidential information stored in the memory regions. Yet further, patching may be performed by the hypervisor-A 116A with respect to the guest driver 126, without violating or invoking patch guard protection for the guest OS 122.

Utilizing the Unused Memory Region(s) for Support Execution of Executable Code

The foregoing description involved implementations wherein the unused (free) memory regions are used as a secure scratchpad to store confidential information shared between the hypervisor-A 116A and the guest VM1 118 (specifically, the guest driver 126). Other uses for the free memory regions are possible, specifically using the free memory regions to store executable code of applications/modules that have been starved out of memory resources by malicious code, which is preventing or delaying the execution of the valid executable code.

In detail, the application(s) 124 running on VM1 118 require memory for their execution. An example is the peer guest module (residing in VM1 118) of the security program 140 or some other antivirus/security module in VM1 118 that requires significant memory in order to fully execute to perform its security functions.

Sophisticated malware can block the use of memory by valid executable code of the peer guest module, via continuous memory allocation. That is, the malware can usurp all or most of the memory regions in the memory pages that are allocated by the guest OS 122 for executable code. A result is that the valid executable code of the peer guest module (e.g., antivirus software) faces a scarcity of memory, thereby preventing or delaying the execution of the antivirus software.

The embodiments described herein addresses the drawbacks in existing systems wherein there is no assurance of memory allocation for valid executable code even though some type of security mechanism is in place. The embodiments described herein also addresses the drawbacks in existing systems wherein a guest OS may not regulate the applications' memory requests, thereby resulting in malicious code possibly usurping the allocations for executable code in the memory pages.

The embodiments described herein provide a technique that enables the memory requirement of valid executable code (e.g., the peer guest module of the security program 140, antivirus software, or other security feature) to be met, in case malicious code has blocked memory access due to a larger usurpation of allocated memory. Like with the other embodiments described above, the guest driver 126 performs operations related to identifying and accumulating unused (free) memory regions in memory pages, and provides such available memory regions to the peer guest module for use in executing its executable code.

FIG. 6 is a flowchart of an example method 600 to use the free memory regions to support the execution of executable code (of a first computer program) in the virtualized computing environment 100 of FIG. 1. The operations depicted in the method 600 parallels, and/or may overlap with, and/or may be in addition to the operations depicted in the method 400 of FIG. 4.

At a block 602 ("LAUNCH GUEST DRIVER AND AUTHENTICATE"), the guest driver 126 launches early in the system bootup sequence, as described in block 402 in FIG. 4. In block 602, the guest driver 126 authenticates itself to the hypervisor-A 116A.

The block 602 may be followed by a block 604 ("PEER GUEST MODULE REGISTERS WITH GUEST DRIVER AND IS NOTED AS TRUSTED"), which may occur during the bootup sequence of shortly thereafter. At the block 604, the peer guest module (e.g., the first computer program) registers with the guest driver 126 and is noted/identified by the guest driver 126 as a trusted peer module of the security program 140. Also at the block 604 (which may occur during the block 404 in FIG. 4), the guest driver 126 may identify other applications/modules in VM1 118, and the guest OS 122 may start determining memory resources to assign to the applications 124, etc.

The block 604 may be followed by a block 606 ("PEER GUEST MODULE REQUESTS MEMORY RESOURCES BUT IS UNABLE TO BE SERVED") wherein the peer guest module (as well as other applications/modules in VM1 118) launches and requests memory allocation from the memory manager of the guest OS 122. It is at this point that malicious code, if present, also requests and is allocated with large amounts of memory.

Therefore, when the peer guest module requests memory resources from the guest OS 122 at the block 606, such request is unable to be served by the guest OS 122 due to insufficient available memory regions in the memory pages. As a result, the peer guest module is unable to continue/complete execution, and the peer guest module determines that a memory anomaly has been observed (e.g., is present) and moves into a partial execution mode, at a block 608 ("PEER GUEST MODULE GOES TO PARTIAL EXECUTION MODE AND SENDS REQUEST TO GUEST DRIVER") that follows the block 606. In embodiment, the peer guest module determines that the memory anomaly/scarcity may be due to malicious code having usurped memory space in the guest memory 138. With respect to the partial execution mode, such a mode can be, for example, the peer guest module having paused in its execution to a point sufficient to determine that the memory anomaly exists, but has paused its execution such that the peer guest module is unable to further diagnose, detect, and remove the malicious code. The partial execution mode can generally refer to an execution state of the first computer program (e.g., the peer guest module) wherein the execution is paused or delayed such that the first computer program is unable to finish launching, has completed execution of some operations but is unable to start or complete other operations due to lack of memory, has aborted its execution, and the like.

At the block 608, the peer guest module sends a request for memory resources to the guest driver 126. The guest driver 126 recognizes the peer guest module as being registered as a trusted module, and searches for free memory regions at a block 610 ("GUEST DRIVER SEARCHES FOR FREE MEMORY REGION(S), AND SENDS THEIR LOCATION(S)").

At the block 610, the guest driver 126 may search for free memory regions for the first time, in response to receiving the request from the peer guest module, or the guest driver 126 may have already compiled/identified a list of free memory regions prior to receiving the request from the peer guest module. For example, the guest driver 126 may have already identified and accumulated the free memory regions (at the block 410 in FIG. 4) for possible use as a scratchpad for storing confidential information and can now allocate such free memory regions for the execution of the peer guest module.

At the block 610, the guest driver 126 searches the memory pages 300 that have been allocated to the peer guest module and/or to other already loaded/running modules/applications 124 (e.g., a second computer program) for unused memory regions 306 (such as shown in FIG. 3) at the ends of the memory pages. The guest driver 126 may search for unused individual or accumulated memory regions having byte space availability that is sufficient to match/store the size of the executable code of the peer guest module. When located, the guest driver 126 sends the location/address of the free memory region(s) to the peer guest module.

The block 610 may be followed by a block 612 ("PEER GUEST MODULE USES FREE MEMORY REGION(S) FOR EXECUTION") wherein the peer guest module receives the address of the free memory region(s) from the guest driver 126, and loads its executable code into the free memory region(s). Once loaded, the executable code is able to continue/complete execution. Through this execution, the peer guest module is able to detect the malicious code and/or able to take some other action, such as alerting the security program 140 of a condition that has usurped large amounts of memory, and then the security program 140 can undertake appropriate remedial action, such as disinfecting (uninstalling the malicious code), running further diagnostics, alerting a system administrator, etc.

Furthermore at the block 612, the guest driver 126 continues to maintain the list of free memory regions, so that other memory requests may be served. The block 612 may be followed by a block 614 ("RELEASE AND CLEAR MEMORY REGION(S)") wherein the peer guest module releases the memory regions after completing its execution and/or after some other condition is met (such as the malicious code having been removed, thereby causing more free memory pages to become available for execution by applications/modules). This releasing enables the memory regions to be available for use/reuse for the execution of other modules, for storing confidential information etc. The guest driver 126 may clear the memory regions, or the contents of the memory regions may be overwritten by new information in due course.

Therefore with the foregoing implementation, modules requiring memory may be provided with memory resources to enable the modules to continue/complete execution, even though malicious code has usurped and caused the scarcity of memory space intended for allocation to valid executable code. In various embodiments, the method 600 of FIG. 6 is applicable to serve modules that are already loaded and have at least partially executed.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1-6. For example, computing devices capable of acting as host devices may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to utilize free memory regions in a memory page for storing confidential information, for providing memory capacity to support the execution of executable code that has been prevented/delayed in its execution, etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

What is claimed is:

1. A method to support execution of a first computer program in a guest supported by a host in a virtualized computing environment, the method comprising:
   attempting execution of the first computer program, wherein the execution of the first computer program is delayed or prevented due to memory scarcity in the guest;
   identifying a memory page in a memory of the guest that includes executable code or data of a running second computer program installed in the guest,
   wherein the memory page comprises a first memory region that includes the executable code or data of the second computer program and a second memory region that does not include the executable code or data of the second computer program, and
   wherein the second memory region is hidden from the second computer program;
   providing the second memory region for storage of the executable code of the first computer program; and
   enabling execution of the executable code of the first computer program from the second memory region.

2. The method of claim 1, wherein the first computer program in the guest includes a security program installed in the guest, and wherein the security program determines that the memory scarcity is due to malicious code having usurped memory space in the memory.

3. The method of claim 1, further comprising:
   clearing the second memory region of the executable code of the first computer program so as to provide availability of the second memory region for other executable code in the guest; and
   releasing the second memory region from the first computer program after completion of the execution of the first computer program.

4. The method of claim 1, further comprising:
   identifying multiple second memory regions, in respective memory pages, that are do not include executable code or data; and
   identifying the second memory region, from amongst the multiple second memory regions, as having a size that matches a size requirement of the executable code of the first computer program.

5. The method of claim 1, wherein the second memory region comprises a particular second memory region, and wherein the method further comprises:
   receiving a request for memory allocation from the first computer program;
   in response to the request from the first computer program, searching memory pages, which have been allocated to the executable code or data of the second computer program or to other executable code or data in the guest, for at least one second memory region that has a size that meets a size requirement of the executable code of the first computer program and that does not include executable code or data; and
   in response to locating the at least one second memory region, being the particular second memory region, sending a location of the particular second memory region to the first computer program.

6. The method of claim 1, wherein attempting the execution of the first computer program includes:
   sending a request, by the first computer program to the guest operating system, for memory allocation;
   receiving, by the first computer program from the guest operating system, a denial of the request due to the memory scarcity; and
   in response to the denial of the request, entering, by the first computer program, a partial execution mode due to the memory scarcity.

7. The method of claim 1, wherein providing the second memory region for storage of the executable code is performed in response to a determination that the first computer program is authenticated and registered.

8. A non-transitory computer-readable medium having instructions stored thereon, which in response to execution by one or more processors in a virtualized computing environment, cause the one or more processors to perform operations to support execution of a first computer program in a guest supported by a host in the virtualized computing environment, the operations comprising:
   attempting execution of the first computer program, wherein the execution of the first computer program is delayed or prevented due to memory scarcity in the guest;
   identifying a memory page in a memory of the guest that includes executable code or data of a running second computer program installed in the guest,
   wherein the memory page comprises a first memory region that has been allocated to the executable code or data of the second computer program and a second memory region that does not include the executable code or data of the second computer program, and wherein the second memory region is hidden from the second computer program;

providing the second memory region for storage of the executable code of the first computer program; and enabling execution of the executable code of the first computer program from the second memory region.

9. The non-transitory computer-readable medium of claim 8, wherein the first computer program in the guest includes a security program installed in the guest, and wherein the security program determines that the memory scarcity is due to malicious code having usurped memory space in the memory.

10. The non-transitory computer-readable medium of claim 8, wherein the operations further comprise:

clearing the second memory region of the executable code of the first computer program so as to provide availability of the second memory region for other executable code in the guest; and releasing the second memory region from the first computer program after completion of the execution of the first computer program.

11. The non-transitory computer-readable medium of claim 8, wherein the operations further comprise:

identifying, by the driver, multiple second memory regions, in respective memory pages, that do not include executable code or data; and identifying the second memory region, from amongst the multiple second memory regions, as having a size that matches a size requirement of the executable code of the first computer program.

12. The non-transitory computer-readable medium of claim 8, wherein the second memory region comprises a particular second memory region, and wherein the operations further comprise:

receiving a request for memory allocation from the first computer program;

in response to the request from the first computer program, searching memory pages, which have been allocated to the executable code or data of the second computer program or to other executable code or data in the guest, for at least one second memory region that has a size that meets a size requirement of the executable code of the first computer program and that does not include executable code or data; and in response to locating the at least one second memory region, being the particular second memory region, sending a location of the particular second memory region to the first computer program.

13. The non-transitory computer-readable medium of claim 8, wherein attempting the execution of the first computer program includes:

sending a request, by the first computer program to the guest operating system, for memory allocation;

receiving, by the first computer program from the guest operating system, a denial of the request due to the memory scarcity; and in response to the denial of the request, entering, by the first computer program, a partial execution mode due to the memory scarcity.

14. The non-transitory computer-readable medium of claim 8, wherein providing the second memory region for storage of the executable code is performed in response to a determination that the first computer program is authenticated and registered.

15. A host in a virtualized computing environment, the host comprising:

a processor; and a non-transitory computer-readable medium coupled to the processor and having stored instructions stored thereon, which in response to execution by the processor, cause the processor to perform operations to support execution of a first computer program in a guest supported by the host, wherein the operations include:

attempt execution of the first computer program, wherein the execution of the first computer program is delayed or prevented due to memory scarcity in the guest;

identify a memory page in a memory of the guest that includes executable code or data of a running second computer program installed in the guest, wherein the memory page comprises a first memory region that has been allocated to the executable code or data of the second computer program and a second memory region that does not include the executable code or data of the second computer program, and wherein the second memory region is hidden from the second computer program;

provide the second memory region for storage of the executable code of the first computer program; and enable execution of the executable code of the first computer program from the second memory region.

16. The host of claim 15, wherein the first computer program in the guest includes a security program installed in the guest, and wherein the security program determines that the memory scarcity is due to malicious code having usurped memory space in the memory.

17. The host of claim 15, wherein the operations further comprise:

clear the second memory region of the executable code of the first computer program so as to provide availability of the second memory region for other executable code in the guest; and release the second memory region from the first computer program after completion of the execution of the first computer program.

18. The host of claim 15, wherein the operations further comprise:

identify, by the driver, multiple second memory regions, in respective memory pages, that do not include executable code or data; and identify the second memory region, from amongst the multiple second memory regions, as having a size that matches a size requirement of the executable code of the first computer program.

19. The host of claim 15, wherein the second memory region comprises a particular second memory region, and wherein the operations further comprise:

receive a request for memory allocation from the first computer program;

in response to the request from the first computer program, search memory pages, which have been allocated to the executable code of the second computer program or to other executable code or data in the guest, for at least one second memory region that has a size that meets a size requirement of the executable code of the first computer program and that does not include executable code or data; and in response to locating the at least one second memory region, being the particular second memory region, send a location of the particular second memory region to the first computer program.

20. The host of claim 15, wherein attempt the execution of the first computer program includes:

send a request, by the first computer program to the guest operating system, for memory allocation;
receive, by the first computer program from the guest operating system, a denial of the request due to the memory scarcity; and
in response to the denial of the request, enter, by the first computer program, a partial execution mode due to the memory scarcity.

21. The host of claim 15, wherein provide the second memory region for storage of the executable code is performed in response to a determination that the first computer program is authenticated and registered.

* * * * *